（12） United States Patent
VanDenBerghe et al.

(10) Patent No.: US 8,920,589 B2
(45) Date of Patent: Dec. 30, 2014

(54) WRAPPING AN OBJECT WITH A FILM USING A TAPE FOR CUTTING THE FILM

(71) Applicant: Garry Cyrille Alfred VanDenBerghe, Coldstream (CA)

(72) Inventors: Garry Cyrille Alfred VanDenBerghe, Coldstream (CA); Robert Amborsky, Winnipeg (CA)

( * ) Notice: Subject to any disclaimer, the term of this patent is extended or adjusted under 35 U.S.C. 154(b) by 0 days.

(21) Appl. No.: 14/054,000

(22) Filed: Oct. 15, 2013

(65) Prior Publication Data

US 2014/0174646 A1    Jun. 26, 2014

Related U.S. Application Data

(60) Provisional application No. 61/715,486, filed on Oct. 18, 2012.

(51) Int. Cl.
| | | |
|---|---|---|
| *C09J 7/02* | (2006.01) | |
| *C09J 5/00* | (2006.01) | |
| *B44C 1/17* | (2006.01) | |
| *B26D 1/547* | (2006.01) | |
| *C08J 7/02* | (2006.01) | |
| *B44C 1/10* | (2006.01) | |
| *B29C 63/00* | (2006.01) | |
| *B29C 63/02* | (2006.01) | |

(52) U.S. Cl.
CPC .............. *B44C 1/1733* (2013.01); *B26D 1/547* (2013.01); *C09J 5/00* (2013.01); *C08J 7/02* (2013.01); *B44C 1/105* (2013.01); *B29C 63/0004* (2013.01); *B29C 63/02* (2013.01); *B29C 2793/009* (2013.01)

USPC ........ 156/248; 156/257; 156/258; 156/304.1; 156/268

(58) Field of Classification Search
CPC ............... B44C 1/105; C09J 7/02; C09J 5/00; B26D 1/5475
USPC ............................................. 428/58, 352, 354
See application file for complete search history.

(56) References Cited

U.S. PATENT DOCUMENTS

| | | | | |
|---|---|---|---|---|
| 2,005,665 | A | * | 6/1935 | Saignier ......................... 428/192 |
| 3,810,813 | A | * | 5/1974 | Ellis .............................. 428/172 |
| 4,255,469 | A | * | 3/1981 | McGinness ................... 427/282 |

(Continued)

FOREIGN PATENT DOCUMENTS

| | | |
|---|---|---|
| CA | 2686003 | 10/2010 |
| CA | 2700471 | 10/2010 |

*Primary Examiner* — Linda L Gray
(74) *Attorney, Agent, or Firm* — Adrian D. Battison; Ade & Company Inc.

(57) ABSTRACT

A pressure sensitive adhesive film attached to a surface is cut by pulling a filament from an adhesive tape applied on to the surface through that part of the film over the tape so as to cut the film and to form a cut edge of the film. The filament is a polyester multi-fiber filament of the order of 16 tex which provides a strength to break of the order of 2 pounds force and an extension of the order of 15% under a load of 1.0 pounds force. The tape comprises a polyethylene substrate of 0.125 inch in width. The filament is extendible so that, when the tape is stretched the filament stretches with the tape and does not pull out or separate. The filament can be broken by hand and has an ability to bend to a radius of curvature of less than 0.5 inches without any stiffness in the filament.

20 Claims, 3 Drawing Sheets

(56) References Cited

U.S. PATENT DOCUMENTS

| | | | | |
|---|---|---|---|---|
| 5,054,618 | A * | 10/1991 | Kim | 229/123.3 |
| 6,235,365 | B1 * | 5/2001 | Schaughency et al. | 428/40.1 |
| 6,875,469 | B2 * | 4/2005 | Langeman | 427/272 |
| 7,014,900 | B2 * | 3/2006 | Langeman | 428/40.1 |
| 7,314,312 | B2 * | 1/2008 | Soderholm | 383/205 |
| 7,914,638 | B2 | 3/2011 | VanDenBerghe | |
| 8,187,407 | B2 | 5/2012 | VanDenBerge | |
| 8,361,615 | B2 | 1/2013 | VanDenBerghe | |
| 2006/0266464 | A1 * | 11/2006 | White | 156/247 |
| 2008/0092483 | A1 * | 4/2008 | Osgood | 53/133.8 |
| 2009/0074994 | A1 * | 3/2009 | McLean | 428/31 |

* cited by examiner

WRAPPING AN OBJECT WITH A FILM USING A TAPE FOR CUTTING THE FILM

This application claims the benefit under 35 USC 119(e) of Provisional Application 61/715,486 filed Oct. 18, 2012.

This invention relates to a method of wrapping an object such as a vehicle with a pressure sensitive adhesive film. This method and tape can be used in relation to films such as a vinyl film containing a pattern or texture or color where the film is intended to remain in place and provide the colored or textured layer on the surface. This is particularly but not exclusively used in providing colored printed coatings on vehicles.

In addition this method and tape can be used in relation to films which are used for masking where the film is place temporarily on the surface and used to mask an area while a coating is applied to the surface and then is removed leaving the delineated coating in place. This is particularly but not exclusively used in providing colored printed coatings on aircraft where the film cannot remain in place.

This application relates to the method and tape disclosed in Canadian Patents 2,686,003 issued Oct. 2, 2012 and 2,700,471 issued Apr. 12, 2011 and in U.S. Pat. No. 8,187,407 issued May 29, 2012, U.S. Pat. No. 8,361,615 issued Jan. 29, 2013 and U.S. Pat. No. 7,914,638 issued Mar. 29, 2011 by the present Applicant, the disclosures of which are incorporated herein by reference or to which reference may be made for further details.

BACKGROUND OF THE INVENTION

Popular customization of vehicles in some cases involves the application of an adhesive film carrying printed graphics to the exterior surface of the vehicle. Such a film is readily available for example from 3M and is provided in large sheets carrying a pressure sensitive adhesive covered by a release layer allowing the sheet to be printed with the required graphics and applied to the vehicle.

Such films can be pre-printed with a pattern, may be single color for cutting into shapes for generating patterns on the vehicle and/or may be textured with varying thicknesses which provide various visual effects. Many different possibilities for the type of film are available and new films become available regularly.

One issue which remains a difficulty is that of cutting the film at required locations so that the film terminates at the edge of a panel or at any other required location on the vehicle.

The above patents show methods of cutting the film applied over a tape attached to the surface to be covered, with the tape carrying a filament which is pulled from the tape to effect a cutting action through the film.

Films have been and are being introduced which cause a significant increase in the difficulty of cutting the film with a clean effective cut. These films provide a softer more pliable vinyl for easier attachment and provide additional textured effects so that the film is inherently more difficult to cut. Such films are typically formed by casting the vinyl material and previous methods of calendaring the vinyl to a constant thickness are typically being replaced. The intention in this industry is to provide more and more enhanced effects by taking the material itself and the patterns into which it is shaped to more extreme processes.

In addition pressure sensitive adhesive films of this type are also widely used as masking material for use in defining or delineating an area to be coated with a colored coating where the method and tape described herein is used for cutting the masking material which is then removed after the coating is applied in the non-masked area.

SUMMARY OF THE INVENTION

It is one object of the invention to provide a method of wrapping a surface with a pressure sensitive adhesive film where the method uses a filament pulled from a tape applied to the surface to effect the cutting action.

According to one aspect of the invention there is provided a method for cutting a pressure sensitive adhesive film to be attached to a surface, the method comprising:

providing a tape having a front surface, a rear surface, a first longitudinal side edge and a second longitudinal side edge;

the tape having an adhesive on the rear surface for attachment to the surface;

the front surface of the tape being free from adhesive and having a release characteristic relative to the pressure sensitive adhesive on the film such that the pressure sensitive adhesive on the film can be contacted onto the front surface of the tape and pulled away for repositioning;

the tape having at least one filament attached thereto;

applying a length of the tape to surface of the object so as to be attached thereto by the adhesive thereon;

positioning the film onto the surface of the object and over the tape such that the film is attached by the pressure sensitive adhesive to the surface of the object, with the release characteristic of the front surface of the tape allowing repositioning of the film;

pulling the filament from the tape through that part of the film over the tape so as to cut the film and to form a cut edge of the film;

and removing the tape from the surface;

wherein the filament has the following characteristics:

the filament is extendible so that, when the tape is stretched during pulling from a supply roll and when applied to the surface, the filament stretches with the tape;

the filament has a strength so that, when applied to the surface, an end of the tape and filament can be broken by hand pulling of the tape without the necessity for cutting;

the filament has a strength so that, when pulled from the tape for cutting the film, the filament cuts the film without breaking;

the filament has an ability to bend to a radius of curvature of less than 0.5 inches without any stiffness in the filament.

Preferably the filament has a weight per unit length which equates to a calculated diameter of the filament, based on an assumption that the filament is circular in cross-section, of less than 0.005 inch.

The filament may be a monofilament, a twisted multi-filament cord or may be a multi-fiber composite filament for example a twisted multi-fiber filament.

The filament is preferably a polymeric material such as polyester or nylon.

It will be appreciated that such polymeric materials when formed into filaments are typically not circular in cross section so that their cross-section is measured in a weight per unit length measurement of tex which is the mass of the filament in grams per 1000 meters of the filament or denier which is the mass in grams of 9000 meters of the filament.

One can calculate the diameter of a filament (assuming it is circular in cross-section, which is typically not correct) given its weight in denier with the following formula:

$$\emptyset = \sqrt{\frac{4.444 \times 10^{-6} \cdot \text{denier}}{\pi \rho}}$$

where ρ represents the material's density in grams per cubic centimeter and the diameter is in cm.

Or using the following formula based on dTEX (grams per 10,000 meters length)

$$\emptyset = \sqrt{\frac{4 \times 10^{-6} \cdot dtex}{\pi \rho}}$$

where ρ represents the material's density in grams per cubic centimeter and the diameter is in cm.

The intention in the present filament is that it has a diameter (assuming it is circular) of less than 0.005 inch (0.127 mm) and preferably less than 0.003 inch (0.0762 mm) and preferably less than 0.002 inch (0.0508 mm) and preferably less than 0.001 inch (0.0254 mm). Depending on the material from which it is formed, the tex or denier of the material can be calculated using the density of the material concerned.

The filament is selected from one of these materials such that it has the minimum diameter to meet the strength requirements for the cutting action set forth above.

Such characteristics of the filament cannot be met by filaments of metal (typically steel), Kevlar or UHMW polyethylene which have a high elastic modulus and cannot be elongated along their length. These materials have very high strength and are typically selected for this purpose on the ground that high strength is required. The present inventors have realized that strength is of secondary importance provided there is sufficient strength to actually cut through the film, and the tape if the filament cuts the tape simultaneously. Thus the strength should be the minimum which can be acceptable and instead the diameter of the filament should be minimized while providing the required strength.

Thus the strength of the filament must be greater than 1.0 pound force to break, so that the action of cutting can be carried out. Where the strength is only slightly greater than 1.0 pounds force it can be maintained less than 3.0 pounds which allows the tape and filament to be both broken by hand.

Thus the filament itself has a strength to break in the range 1 to 3 pounds force. That is a filament having a strength to break greater than 3 pounds and up to 5 pounds is less desirable to use because the strength is unnecessary so that the filament is better to be finer than stronger. It has been established that the pull strength of the order of 1 pound is sufficient to allow the filament to tear through multiple layers simultaneously of the vinyl material provided by 3M which is the preferred film used in the industry. Provided this can be achieved, any additional strength is unnecessary.

Thus the combination of the tape and the filament has a strength to break of less than 3.5 pounds force which reasonable allows the tape and filament to be snapped by hand by the installer as he reaches the end of the tape strip to be applied. This is of significant advantage in the time required for installation. This ability to hand break the tape and filament is a consequence of the realization that the high strength required in previous proposals is not required.

With regard to extensibility, the tape itself is highly extensible having an extension under a load of 8 to 12 pounds force per inch width of the order of 300 to 830%. In many cases the tape is formed of polyethylene or a polyethylene/polyester multi polymer film mix, which provides the high extensibility. Such a high extension under load allows the tape to bend left to right in its plane to follow curvatures of less than 0.5 inches as set forth above. To achieve such curvatures in a tape of the order of 0.125 inches in width and wider, one side must extend significantly relative to the other side creating an extension gradient across the tape. Previous filaments in order to achieve the high strength believed to be required have been basically inextensible under the loads involved.

The filament of the present invention has been determined to require an extension greater than 15% under a load of 1.0 pounds force. This extension of the filament allows it to extend during the side to side bending of the tape. This extension of the filament allows it to extend during the application of the tape to the surface. That is the filament extends with the tape as the tape is pulled by the installer with a significantly reduced tendency of the filament to break out of the tape. It has been found that inextensible filaments of the type previously used and proposed, due to the differential in extension from the tape, tend to break out of the adhesive leaving the filament and tape as separate components so that the installer must try to apply the tape while re-inserting the filament into the tape as it is applied. This pulling action on the tape can occur as it is pulled off the supply roll or as it is applied onto the surface. In both cases the separation of filament and tape is highly problematic.

The above stated extension of 15% under a load of 1.0 pounds force has been found to be sufficient to allow the tape and filament to remain connected during the level of stretching of the tape which occurs in practice. The reduction in differential forces tending to separate the filament from the tape also reduces the requirement to have a high bond between the filament and the adhesive on the tape so that filaments which are inherently less able to bond to the adhesive can be used.

Thus the tape with the filament attached should turn through a radius of curvature in both directions (in the plane of the tape) which is less than 3 inches and more preferably less than 1.0 m inch or even 0.5 inch without the filament pulling away from the underneath the tape. That is the adhesion of the filament underneath the tape and the ability of the tape and filament to generate the differential stretch must be necessary to make these turns.

The above reduction in required strength which leads to a reduction in diameter (or denier) of the filament also allows a further significant advantage in that the necessity to bond the filament to the adhesive on the tape or bond the adhesive to the surface is much reduced. A high diameter of the filament of greater than 0.005 inch lifts the tape at the location of the filament away from the surface in a "tenting" effect which necessarily reduces the contact width of the adhesive on the surface. A filament of smaller diameter allow a greater width of the tape to be applied to the surface thus increasing the bond of the tape to the surface and reducing the possibility that the filament can escape from the highly bonded tape.

Thus a filament useable in the above method preferably has the following characteristics:

A strength to break in the range 1 to 3 pounds force;

An extension of at least 15% under a load of 1.0 pounds force;

A weight per unit length which equates to a calculated diameter of the filament, based on an assumption that the filament is circular in cross-section, of less than 0.005 inch;

the ability to bend, with zero resistance to bending, to a radius of curvature of less than 0.5 inches.

In one example, a polyester multi-fiber filament of 16 tex can be used which provides a strength to break of 2 pounds force, an extension of 15% under a load of 1.0 pounds force.

The 16 tex polyester fiber described herein has a calculated diameter a little less than 0.005 inch.

This filament with a tape formed from polyethylene of 0.125 inch in width has a combined breaking strength of 2.5 pounds force and can bend side to side to a radius of curvature of 0.5 inches without the filament breaking out from the tape.

This filament provides a breaking strength sufficient to cut through 3 layers at a total of 18 mil (0.018 inch) thickness of materials from 3M sold under the designation 480cv3 which has been recently introduced. The filament can also cut four layers at a total of 20 mil (0.020 inch) thickness of conventional vinyl film and provides a cut line which under magnifying glass is a clean line with no jagged edges. It will be appreciated in this regard that the filament is in some cases required to cut through more than one layer of film and up to three or four layers where the films are overlaid to provide a particular graphics effect with the films.

Preferably the tape is extensible so as to allow bending to at least one side by extension along the opposite side.

Preferably the filament is spaced from both side edges to allow bending in both directions. However the filament can be located at or adjacent one edge and other techniques used to effect bending away from the edge with the filament.

Preferably the filament is less extendible than the tape.

Preferably the filament is carried in or on the adhesive on the rear surface. In this case, the adhesive is arranged to hold the filament in place on the tape during bending of the tape while the tape is applied to the surface and while the filament is being pulled to effect the cutting of the film. In this case, the filament when carried on the adhesive has a coating material compatible with the adhesive for generating an improved adhesion between the filament and the adhesive.

In an alternative arrangement, the adhesive is applied onto the substrate over the filament to hold the filament against the surface of the substrate.

Preferably the filament is spaced from the first and second side edges and the tape has a width arranged such that the filament tears through the tape along the length of the tape, when pulled to cut the film, rather than pulling from one side edge of the tape. In this case the tearing of the tape leaves a portion of the tape along the first side edge underneath the edge of the film which is removed after the film is cut and the edge laid flat on the surface. In this case, preferably the tape is colored to visually distinguish the portion of the tape from the film.

In some cases a primer is applied to the surface at least underneath the tape for increased attachment of the edge of the film to the surface and the adhesive of the tape preferably has the characteristic that the tape can be pulled from the primer on the surface of the object without leaving a residue of the adhesive and without damaging the primer surface.

Preferably the tape is formed of a plastics material allowing stretch of the tape greater than that of the filament. Preferably the tape is formed of a Copolymer plastic film. The pressure sensitive adhesive on the tape can be rubber based or acrylic bases as both can provide the required properties of adhesion and subsequent removal of the tape.

Preferably the tape carries a release coating on the front surface or has base material properties having release characteristics relative to the pressure sensitive adhesive on the film such that the pressure sensitive adhesive on the film can be contacted onto the front surface of the tape and pulled away for repositioning without dislodging the tape from the object.

In accordance with another feature the tape may comprise a laminate of a first substrate carrying the adhesive on a rear surface thereof and a second substrate carrying a release coating on a front surface thereof with the filament located between the first and second substrates.

In many cases the object includes a hinged panel which can move from a closed position in which an edge of the panel abuts an adjacent edge portion of the object and the method includes:

applying a single length of the tape to the panel along an edge of the panel so that the tape bridges between the edge of the panel and the adjacent edge portion of the object so as to be attached to both;

applying the film over the panel and the object at the edge of the panel so as to wrap the object and apply the pattern to the object with the film being attached to the panel and the object by the adhesive;

pulling said at least one filament of the single length of tape from the tape so as to cut the film along a line to form two cut edges of the film;

removing any remaining portions of the tape from the edge of the panel and from the edge portion of the object;

and attaching the cut edges of the film to the object.

Preferably in this case the tape is located such that the filament is positioned between the edge of the panel and the edge portion of the object.

Preferably in this case the tape is located such that the filament is spaced from the edge of panel and the cut edge of the film on the panel is wrapped around the edge of the panel and attached to a back surface of the panel.

Preferably in this case there is provided a visibly distinct colored stripe which can be along a center line of the tape identifying the position of the filament so as to assist in locating the filament at a position between the edge of the panel and the edge portion of the object.

Alternatively the film can be semi-transparent to achieve the effect of allowing the center line to be visually determined for location on the surface.

The filament can comprise a single filament located between the two edges. This arrangement cuts between the edges or adjacent one of the edges but in all cases will leave at least one and generally two edge strips of the sheet to be wrapped around the edges of the vehicle body.

As an alternative the tape can use two side by side parallel filaments. In this arrangement a first one of the filaments is located at or adjacent an edge of the panel and a second one of the filaments is located at or adjacent the adjacent edge portion of the object. This acts to reduce or eliminate a portion of the sheet which is left hanging beyond the edge of the panel or body.

Preferably the object includes a surface to be wrapped with an area within the surface on which the object is not to be wrapped and the method includes:

applying a length of the tape to the surface so as to surround the area with ends of the length substantially butting;

applying the film over the surface including the area so as to wrap the object and apply the pattern to the object with the film being attached to the surface and the object by the adhesive;

pulling the filament of the length of tape from the tape so as to cut the film around the area;

removing a remaining portion of the length of the tape from the surface;

and removing a portion of the film over the area.

The method can include printing onto a second opposed surface of the film a pattern to be wrapped onto the object so as to apply the pattern around a part of the object and over the panel.

The method can be used to apply various types of film such as vinyl to vehicles. This can include large sheets or panels which are used to wrap or can include stripe packages that also require cutting. Some vehicles have reflective vinyl striping down both sides, so the stripe must be cut around the wheel wells, door handles and the like. Pinstripes on cars, trucks etc, also require cutting and again this application would alleviate the use of a knife. All applications can be done using various types of vinyl, perhaps printed or unprinted.

The tape may include a substrate with the adhesive applied to one surface of the substrate, or the tape may comprise simply an adhesive material with the filament attached thereto or embedded therein.

For some uses the filament can be formed of other suitable materials such as metal wire, carbon fiber, Kevlar or UHM-WPE (ultra high molecular weight polyethylene) synthetic fiber. In some tapes Kevlar is preferred.

The absence of adhesive on the front surface of the tape can be used to allow the film position to be adjusted on the panel and on the object so that it is properly placed and located without creases or folds or bubbles while aligning printed images from different sheets as required. Thus the pressure sensitive adhesive on the film itself is used to attach the film to all locations and the release coating is of a character that the film can be pulled back and re-located when required without dislodging the tape from the object.

Films of this type are available with a release layer from suppliers such as 3M and can be printed with the pattern at the place of application using designs supplied by a customer.

The object is typically a vehicle or boat or other transportation device including automobiles, vans, airplanes, trucks, buses and the like.

The area to be left uncovered can be any area of a surface of the object such as a door handle, gas filler cap or the like. In this case the whole surface of the vehicle or other object is to be covered but includes such areas which cannot be covered without interfering with the operation.

However other objects can be covered where the problem of doors or other panels and the problem of areas to be left uncovered is to be resolved using the above invention. The film typically wraps around at least a side of the vehicle where the hinged panel is a door and around a rear of the vehicle where a second hinged panel is provided and covered using the invention.

According to a second aspect of the invention there is provided a tape comprising:

a tape body having a front surface, a rear surface, a first longitudinal side edge and a second longitudinal side edge;

the tape body having an adhesive on the rear surface for attachment to an object;

the tape body having a longitudinally extending filament attached thereto;

wherein the filament has the following characteristics:

a strength to break in the range 1 to 3 pounds force;

an extension of greater than 15% under a load of 1.0 pounds force;

the ability to bend, with zero resistance to bending, to a radius of curvature of less than 0.5 inches.

Preferably the filament has a weight per unit length which equates to a calculated diameter of the filament, based on an assumption that the filament is circular in cross-section, of the order of or less than 0.005 inch;

Preferably the filament comprises a polyester multi-fiber filament of the order of 16 tex which provides a strength to break of the order of 2 pounds force, an extension of the order of 15% under a load of 1.0 pounds force.

Preferably the tape can bend side to side to a radius of curvature of 0.5 inches without the filament breaking out from the tape.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The following description is primarily taken from the above cited patents of the present Applicants and is included for completeness.

In order to effect cutting of a pressure sensitive film there is provided a tape 30 shown in FIGS. 1 to 4 having a front surface 31, a rear surface 32, a first longitudinal side edge 33 and a second longitudinal side edge 34. The tape has an adhesive layer 35 on the rear surface 32 for attachment to the vehicle. The tape 30 is free from adhesive on the front surface 31 which instead has a release characteristic allowing it to release from or to repel adhesive such as the adhesive 19 on the sheet 15. This release characteristic is typically provided by an actual coating 31A but can be provided by the characteristics of the substrate itself or by a co-extruded layer on the substrate. The release coating is not intended to be removed and is not therefore a removable peel away sheet. The tape 30 carries a filament 36.

The filament can be located along one longitudinal side edge 33 or 34 but preferably is located along a line part way or mid way across the tape spaced from both the first and second longitudinal side edges 33, 34.

Figure 1:
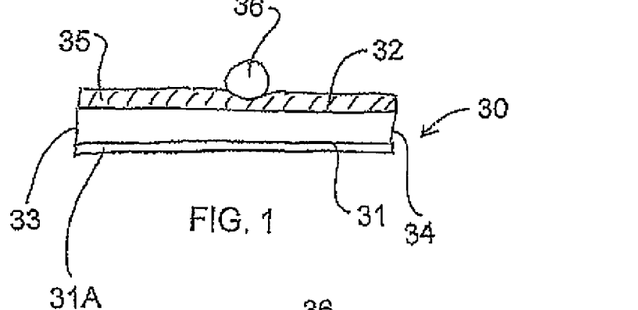
FIGS. 1 to 4 show cross sectional views through four embodiments of tape for use in the present invention.

In FIG. 1, the filament is simply applied onto the adhesive layer 35 and is attached thereto. Thus the filament can be simply attached to a pre-exiting tape. Typically the thickness of the tape base or substrate and the adhesive is of the order of 0.002 to 0.005 inches. The filament has the characteristics set out hereinbefore.

Figure 2:
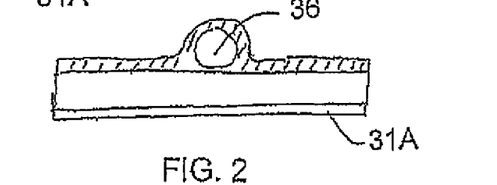

In FIG. 2, the adhesive is applied after the filament is laid on the tape substrate and thus covers over the filament providing an enhanced attachment where required.

Figure 3:
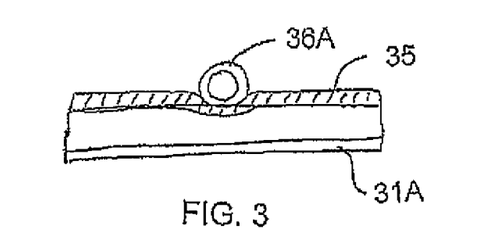

In FIG. 3, the filament carries a pre-applied adhesive or primer material 36A which co-operates with the adhesive 35 providing an enhanced attachment where required.

Figure 4:
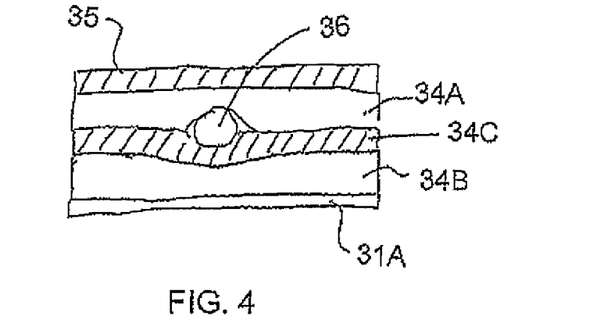

In FIG. 4 and alternative construction is provided which includes two substrate layers 34A and 34B laminated together by a laminating adhesive 34C with the filament 36 captured between the layers 34A and 34B and thus held in place. The layer 34A carries on its rear surface the adhesive 35 and the layer 34B carries on its front surface the release coat 31A. The laminating adhesive 34C has to be such that it allows the filament to release from it. The filament could be treated to prevent becoming fixed to the adhesive if say the laminating adhesive was the cross linkable type. This is not an issue if pressure sensitive adhesive is used for the laminating adhesive.

The tape is extensible to a degree so as to allow bending to at least one side by extension along the opposite side. Thus the tape can bend to each side through any angle to take up a minimum inside radius of curvature of the order of 0.157 inches. This allows it to be bent or wrapped around elements on the vehicle such as door handles and other items previously described while the tape remains flat against the vehicle surface and attached to the vehicle surface by its layer of adhesive.

As shown the filament is spaced from both side edges to allow bending in both directions. As the filament is located in the middle as shown, the tape is symmetrical and will bend equally in each direction. However the filament can be offset to one side or can be at one edge. In this case the tape can be arranged so that it is applied easily with curvature only in one direction with the filament always on the inside of the curve. With this same configuration, a reverse curve, with the filament on the outside of the curve, can be done by making partial cuts at spaced positions at right angles to its length along the inside edge to allow the edge to be compressed to form the inside curve. Typically the filament is less extendible than the tape since longitudinal extension of the filament in the longitudinal direction is undesirable during the pulling action.

The adhesive thus acts to hold the filament in place on the tape during bending of the tape while the tape is applied to the surface and while the filament is being pulled to effect the cutting of the film.

The tape is formed of a plastics or filmic material allowing stretch of the tape greater than that of the filament and preferably the tape is formed of a PVC which has been found to provide the best characteristics of strength, co-operation with film adhesive, elongation and clean cutting of the film.

In use, a first length 30A of the tape is applied and adhesively attached to the panel such that the second longitudinal side edge 34 is applied substantially along the edge 16 of the panel and the first longitudinal side edge 33 is spaced from the edge 16 of the panel.

The film 15 is attached by the adhesive 19 over the panel and the vehicle at the edge of the panel so as to wrap the vehicle and apply the pattern 20 to the vehicle with the film being attached to the vehicle by the adhesive 19.

The cutting of the film cannot be carried out in advance of the application since the film stretches and moves as it is applied in order to take up the contours of the vehicle. In many cases it is necessary to apply the film over certain areas and remove it from that area a number of times in order to take up the required position and shape. In some cases it is necessary to apply heat to the film in order to achieve the necessary stretch to match a particularly difficult contour of the vehicle. Thus in effect the film is tailored to the vehicle shape as it is applied making pre-cutting of edges impossible. The whole intention is to apply the film in as large a sheet as possible so that it is in most cases not suitable to cut up the sheet into small pieces for individual application.

The attachment is completed using the skill of the user to properly apply the film without creases and kinks, where necessary pulling the film back from the vehicle surface and the tape to adjust. When attachment is complete, the filament 36 of the first length from the tape is pulled at P1 (FIGS. 5 and 6) so as to cut the film at the first length of tape 30A. The filament 36 of the second length from the tape is pulled so as to cut the film at the second length 30B.

Figure 5:
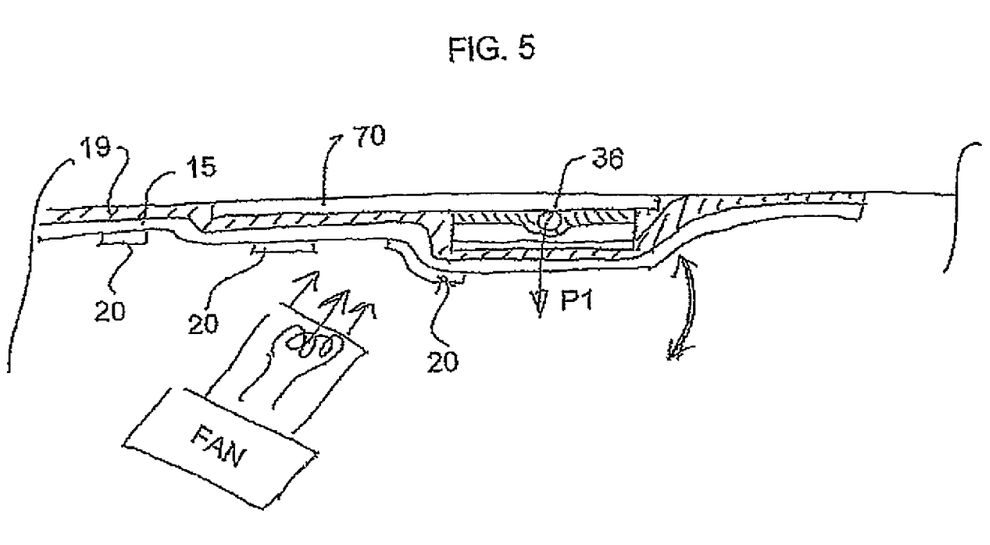
FIG. 5 is a cross sectional view through a surface of an object showing the tape and film applied during a first step in the method.
Figure 6:
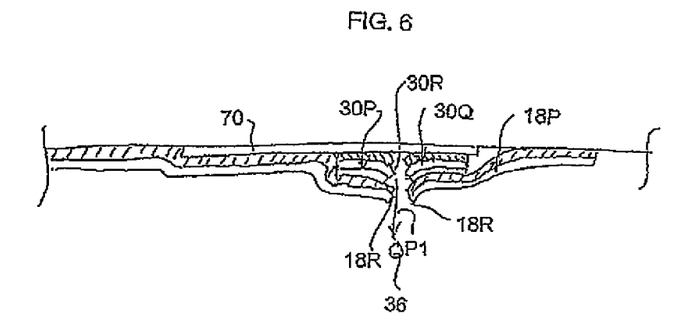
FIG. 6 is a cross sectional view through the surface and the tape and film with the filament of the tape pulled to effect cutting of the film.

The filament 36 is spaced from the first and second side edges 33, 34 and the tape has a width arranged such that the filament tears through the tape 30 along the length of the tape, when pulled to cut the film, rather than pulling from one side edge 33, 34 of the tape. This is shown in FIGS. 5 and 6 where the filament 36 is pulled out through a tear 30R in the center of the tape 30. This acts to cut the film at the location directly over the tear in the tape as indicated at 18R.

The tearing of the tape leaves a portion 30P of the tape along the first side edge underneath the edge of the film. The tearing of the tape leaves a portion 30Q of the tape along the first side edge underneath the portion 18P of the film which is intended to be removed from the cut edge of the film.

Figure 7:
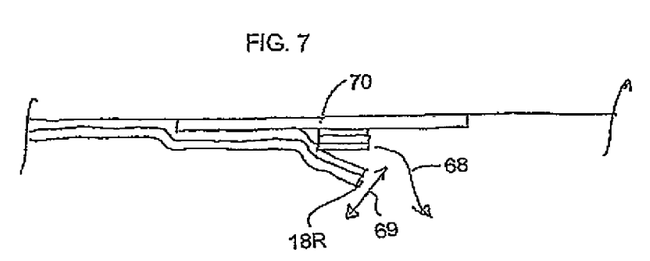
FIG. 7 is a cross sectional view through the surface and the film with the film cut and the last portion of tape being removed.

The portion 18P of the film and the portion 30Q of the tape are simply removed as they are freely exposed beyond the cut edge 18R. The portion 30P of the tape is removed as indicated at 68 after the film is cut by lifting the edge of the film as indicated at 69 and by carefully pulling the portion away from the cut edge generally parallel to the surface of the vehicle. After the portion 30P is removed, the edge portion of the film at the cut edge 18R is laid flat on the surface of the vehicle. In order to assist in identifying and locating the portion 30P of the tape to ensure that it is all removed, the tape is preferably brightly colored to visually distinguish the portion of the tape from the film.

In some cases to assist in attaching the edge of the film to the surface, a band of primer is applied to the surface at least underneath the tape for increased attachment of the edge of the film to the surface. The adhesive of the tape has the characteristic that the tape can be pulled from the primer 70 on the surface of the object without leaving a residue of the adhesive and without damaging the surface. It will be appreciated that the primer is designed to ensure an increase in adhesive effect with the adhesive 19 of the film and hence the adhesive 35 of the tape must be arranged such that it does not adhere more effectively to the primer in a manner which would prevent simple removal of the tape portions or would lead to adhesive residue being left on the vehicle surface at the primer.

The release coating 31A on the front surface of the tape 30 has a release characteristic relative to the pressure sensitive adhesive 19 on the film such that the pressure sensitive adhesive on the film can be contacted onto the front surface of the tape and pulled away for repositioning.

The release characteristic of the front side of the tape is critical to the application. Not enough release and the wrap film adhesive will stick to the tape and pull the tape off the automobile during repositioning of the wrap film during normal fitting of the wrap film to the automobile.

The release characteristic can be provided by the character of the tape itself in which the base material can be such (Teflon for example) which has low adhesion with the wrap film adhesive. The surface of the base tape film can also be embossed with a pattern that limits the contact area of the film's adhesive thus providing good release. Alternatively a release coating (silicone etc.) can be added to the front surface of the tape to do the same thing. Most tapes are coated on the front surface so that you can pull the tape off the roll. Electrical tape is unsuitable in that it has little or no release coating because it has to stick to itself when wrapped around a wire.

Plastic film based tape works better then paper based tape to produce a clean cut (like a razor) through the wrap film. Paper based tapes produce jagged cuts noticeable to the eye and touch.

The filament 36 comprises a polyester multi-fiber filament of the order of 16 tex which provides a strength to break of the order of 2 pounds force and an extension of the order of 15% under a load of 1.0 pounds force. The tape substrate 35 comprises a polyethylene substrate of 0.125 inch in width. This selection of materials provide the following characteristics:
  the filament is extendible so that, when the tape is stretched during pulling from a supply roll and when applied to the surface, the filament stretches with the tape;

the filament has a strength so that, when applied to the surface, an end of the tape and filament can be broken by hand pulling of the tape without the necessity for cutting;

the filament has a strength so that, when pulled from the tape for cutting the film, the filament cuts the film without breaking;

the filament has an ability to bend to a radius of curvature of less than 0.5 inches without any stiffness in the filament.

the filament has a weight per unit length which equates to a calculated diameter of the filament, based on an assumption that the filament is circular in cross-section, of less than 0.005 inch.

the strength of the filament is greater than 1.0 pound force to break.

the strength of the filament is less than 3.0 pounds force which allows the tape and filament to be both broken by hand.

the filament has a strength to break in the range 1 to 3 pounds force.

the filament has a strength to break just sufficient to cut through four layers of the film.

the combination of the tape and the filament together have a strength to break of less than 3.5 pounds force.

the tape alone has an extension under a load of 8 to 12 pounds force per inch width of the order of 300 to 830%.

the tape can bend left to right in its plane to follow curvatures of radius less than 3.0 inches.

the filament has an extension greater than 15% under a load of 1.0 pounds force.

the extension of the filament is arranged to allow the tape and filament to remain connected during the stretching of the tape.

In the method, several layers of the film can be laid superimposed and the method using the above tape allows simultaneously cutting three layers of the film. In addition the tape and filament are broken by hand at the end of a strip of the tape.

The invention claimed is:

1. A method for cutting a pressure sensitive adhesive film to be attached to a surface, the method comprising:

providing a tape having a front surface, a rear surface, a first longitudinal side edge and a second longitudinal side edge;

the tape having an adhesive on the rear surface for attachment to the surface;

the front surface of the tape being free from adhesive and having a release characteristic relative to the pressure sensitive adhesive on the film such that the pressure sensitive adhesive on the film can be contacted onto the front surface of the tape and pulled away for repositioning;

the tape having at least one filament attached thereto;

applying a length of the tape to the surface so as to be attached thereto by the adhesive thereon;

positioning one or more layers of the film onto the surface and over the tape such that the film is attached by the pressure sensitive adhesive to the surface, with the release characteristic of the front surface of the tape allowing re-positioning of the film;

pulling the filament from the tape through that part of the film over the tape so as to cut the film and to form a cut edge of the film;

and removing the tape from the surface;

wherein the filament has the following characteristics:

the filament is extendible so that, when the tape is stretched during pulling from a supply roll and when applied to the surface, the filament stretches with the tape;

the filament has a strength so that, when applied to the surface, an end of the tape and filament can be broken by hand pulling of the tape without the necessity for cutting;

the filament has a strength so that, when pulled from the tape for cutting the film, the filament cuts the film without breaking;

the filament has an ability to bend to a radius of curvature of less than 0.5 inches without any stiffness in the filament.

2. The method according to claim 1 wherein the filament has a weight per unit length which equates to a calculated diameter of the filament, based on an assumption that the filament is circular in cross-section, of less than 0.005 inch.

3. The method according to claim 1 wherein the filament is a polymeric material.

4. The method according to claim 1 wherein the filament has a diameter of less than 0.005 inch (0.127 mm).

5. The method according to claim 1 wherein the filament is selected such that it has the minimum diameter to meet the strength requirements for cutting the film.

6. The method according to claim 1 wherein the strength of the filament is greater than 1.0 pound force to break.

7. The method according to claim 1 wherein the strength of the filament is less than 3.0 pounds force which allows the tape and filament to be both broken by hand.

8. The method according to claim 1 wherein the filament has a strength to break in the range 1 to 3 pounds force.

9. The method according to claim 1 wherein the filament has a strength to break just sufficient to cut through four layers of the film.

10. The method according to claim 1 including simultaneously cutting three layers of the film.

11. The method according to claim 1 including breaking the tape and filament by hand at the end of a strip of the tape.

12. The method according to claim 1 wherein the combination of the tape and the filament together have a strength to break of less than 3.5 pounds force.

13. The method according to claim 1 wherein the tape alone has an extension from an un-extended length under a load of 8 to 12 pounds force per inch width of the order of 300 to 830% of the un-extended length.

14. The method according to claim 1 wherein the tape is arranged to bend left to right in its plane to follow curvatures of radius less than 3.0 inches.

15. The method according to claim 1 wherein the filament has an extension from an un-extended length greater than 15% of the un-extended length under a load of 1.0 pounds force.

16. The method according to claim 1 wherein the extension of the filament is arranged to allow the tape and filament to remain connected during the stretching of the tape.

17. The method according to claim 1 wherein the filament is carried in or on the adhesive on the rear surface of the tape.

18. The method according to claim 1 wherein the filament is spaced from the first and second side edges and the tape has a width arranged such that the filament tears through the tape along the length of the tape, when pulled to cut the film, rather than pulling from one side edge of the tape.

19. The method according to claim 1 wherein the filament comprises a polyester multi-fiber filament of 16 tex which provides a strength to break of 2 pounds force and an extension from an un-extended length of 15% of the un-extended length under a load of 1.0 pounds force.

20. The method according to claim 1 wherein the tape comprises a polyethylene substrate of 0.125 inch in width.

* * * * *